(12) United States Patent
Kauppi

(10) Patent No.: US 8,390,232 B2
(45) Date of Patent: Mar. 5, 2013

(54) PERMANENT MAGNET MOTOR WITH FIELD WEAKENING

(75) Inventor: Erik Kauppi, Ann Arbor, MI (US)

(73) Assignee: Current Motor Company, Inc., Ann Arbor, MI (US)

( * ) Notice: Subject to any disclaimer, the term of this patent is extended or adjusted under 35 U.S.C. 154(b) by 0 days.

(21) Appl. No.: 13/553,992

(22) Filed: Jul. 20, 2012

(65) Prior Publication Data

US 2012/0286615 A1     Nov. 15, 2012

Related U.S. Application Data

(63) Continuation of application No. 13/315,872, filed on Dec. 9, 2011, now Pat. No. 8,288,982.

(60) Provisional application No. 61/421,952, filed on Dec. 10, 2010.

(51) Int. Cl.
    *H02P 1/16*     (2006.01)
(52) U.S. Cl. ........ 318/538; 318/539; 318/540; 318/541; 318/542
(58) Field of Classification Search .................. 318/538, 318/539–542
See application file for complete search history.

(56) References Cited

U.S. PATENT DOCUMENTS

| 5,293,518 | A | * | 3/1994 | Wilson ..................... 318/400.42 |
| 5,455,473 | A | | 10/1995 | Lipo et al. |
| 5,821,710 | A | | 10/1998 | Masuzawa et al. |
| 6,541,877 | B2 | | 4/2003 | Kim et al. |
| 7,408,278 | B2 | | 8/2008 | Murota et al. |
| 7,602,137 | B2 | | 10/2009 | Du et al. |
| 7,608,965 | B2 | | 10/2009 | Aydin et al. |
| 2006/0043916 | A1 | | 3/2006 | Henslee et al. |

OTHER PUBLICATIONS

Sozer, Y. et al., "Adaptive Flux Weakening Control of Permanent Magnet Synchronous Motors," IEEE, 1998, pp. 475-482.

* cited by examiner

*Primary Examiner* — Walter Benson
*Assistant Examiner* — David Luo
(74) *Attorney, Agent, or Firm* — Brooks Kushman P.C.

(57) ABSTRACT

A permanent-magnet electrical machine is disclosed in which the rotor or stator have at least one movable iron segment. A magnetic field of the electric machine is weakened when the movable iron segment is moved a position away from the rotor or stator, respectively. When the movable iron segment is in a first position, such as in contact with the rotor or stator, the field strength is high. When the movable iron segment is in a second position in which the movable iron segment is displaced away from the rotor or stator, the field strength is low. The ability to weaken the field strength causes the constant-power, speed ratio to be increased and thereby increases the utility of the electric machine for applications in which a wide speed range is desired. The electric machine may be used as both a permanent-magnet motor and generator.

20 Claims, 10 Drawing Sheets

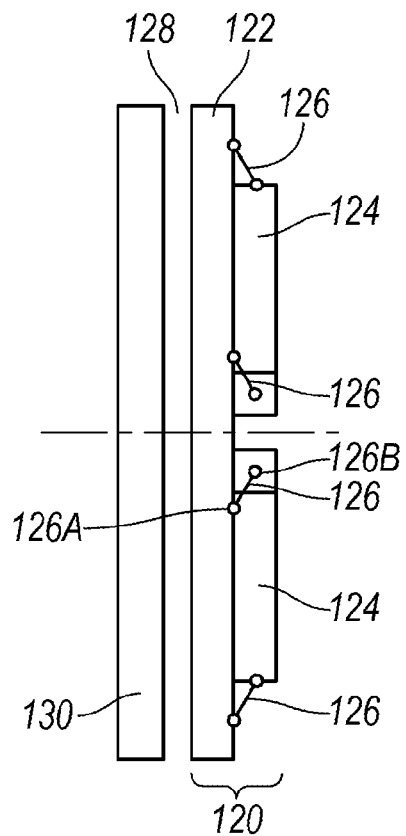
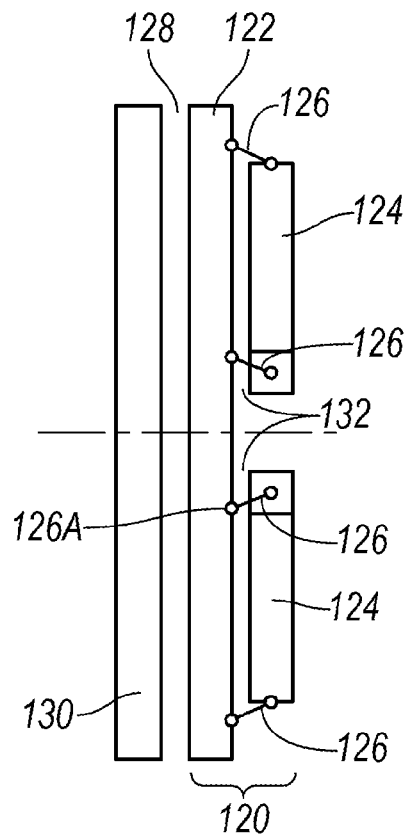
FIG. 6   FIG. 7
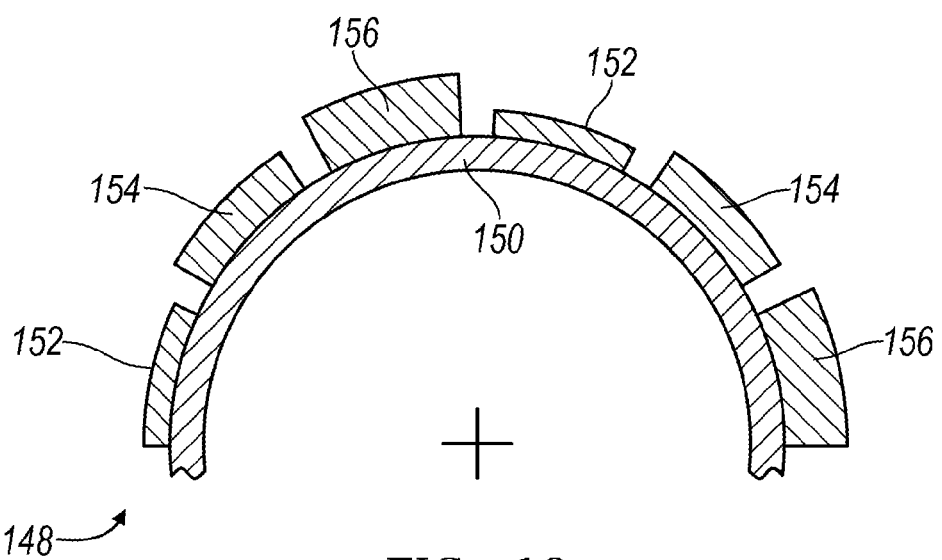
FIG. 10

PERMANENT MAGNET MOTOR WITH FIELD WEAKENING

CROSS-REFERENCE TO RELATED APPLICATIONS

This application is a continuation of U.S. application Ser. No. 13/315,872, filed Dec. 9, 2011 which claims the benefit of U.S. provisional Application No. 61/421,952 filed Dec. 10, 2010, the disclosures of which are incorporated in their entirety by reference herein.

TECHNICAL FIELD

The present disclosure relates to magnetic field weakening in a permanent magnet motor.

BACKGROUND

There is a need for efficient electrical machines that have high torque capability over a large speed range and the ability to control machine speed, in particular for electrical drives for vehicles, such as electric or hybrid vehicles, or other electric generation applications which require high torque at zero and low speed.

For purposes of providing traction power, such as in electric vehicles, it is desirable to have an electric motor with a high constant power speed ratio (CPSR). Referring to FIG. 1, torque and power as a function of speed is shown for an electric motor. At low speed, high torque is available with such torque assisting with launch. As $N_{min}$ is reached, the motor's maximum power is accessed and no more power is available as speed is further increased. Recalling that $P=2*\Pi*T*N$; as power, P, is constant, as speed, N, is increased, torque, T, reduces. CPSR is the maximum speed at which rated power can be delivered ($N_{max}$) divided by the lowest speed at which maximum power is available ($N_{min}$). $N_{min}$ is also the highest speed at which rated maximum torque can be delivered. The maximum speed ($N_{max}$) is limited primarily by a limit on back EMF voltage, and also by damage to the rotor or other inherent limitations of the motor. For example shown in FIG. 1, the CPSR is a factor of two.

It is desirable to have a CPSR of four or more for automotive applications. Although it is possible to achieve that with induction motors, motors with field coils, or switched reluctance motor technologies, permanent magnet motors are preferred due to their higher power density and higher efficiency. Permanent magnet (PM) motors, however, do not inherently have CPSRs in such a high range. A significant amount of effort is being expended in determining cost-effective, lightweight, and efficient solutions to address the limited CPSR of PM motors.

One alternative is to provide a transmission between the electric motor and the final drive. However, transmissions are heavy, costly, and must be controlled, either by the operator or by a controller. Another alternative is to electrically adjust the field strength of the electric motor if it has electrically excited field windings. This approach is not available to motors with permanent magnet fields.

Another approach to is to weaken the magnetic field, thus increasing the motor speed for a given back EMF or applied voltage. For any given motor, torque produced is proportional to current multiplied by magnetic field strength, while RPM is proportional to voltage/field strength. So for a given power (voltage*current) in, a motor makes a certain amount of mechanical power, (T*N). If the magnetic field is weaker, the motor makes the same power but at higher speed and lower torque.

In an electric motor, there is an air gap between the rotor and the stator. The motor is usually designed to have as small an air gap as practical. The field strength can be weakened, however, by increasing that air gap. Such a system has been employed in axial flux motors, in which the rotor and the stator are substantially disk shaped. The displacement between the two disks can be increased to reduce the field strength. In a radial flux motor, the rotor may be centrally located with the stator arranged outside the rotor circumferentially displaced from the rotor. If the rotor, for example, is displaced along the axis of rotation, the effective field strength of the radial flux motor is reduced. The mechanisms that adjust the relative positions of the rotor and stator are relatively expensive and yield a more cumbersome motor. In alternatives in which a portion of the windings are switched off or the relative positions of the rotor and stator are adjusted, an electronic controller commands the adjustments based on input signals. Such controllers can be costly.

SUMMARY

According to embodiments of the present disclosure, the field strength of the motor is altered by adjusting the reluctance of the back iron of at least one of the rotor and the stator. By providing the back iron with both a thin, fixed back iron portion, or in some embodiments none at all, and a movable back iron portion, adjustments in the field strength are possible. When the movable back iron portion is in contact with the fixed back iron, the two act as one larger back iron. When the movable back iron portion is displaced from the fixed back iron, the fixed back iron is substantially the full extent of the back iron. Almost all the magnetic flux has to pass through this thin fixed back iron section, so the fixed back iron is "saturated" or its "magnetic resistance" or reluctance goes up, thereby reducing the field strength.

In embodiments in which movable back iron segments are applied to the rotor, and the rotor is external around a central stator, the actuation of the back iron segments between the first position (in contact with the fixed back iron) and the second position (separated from the fixed back iron) can be effected by centrifugal force. There is a small magnetic force causing the fixed and movable back irons to remain in contact. However, as the speed of the rotor increases, the centrifugal force can overcome this weak attraction causing the movable back iron segments to move away from the fixed back iron. In such an embodiment, a tray or other retainer can be provided to catch the movable back iron segments as they move away from the fixed back iron. As the rotor speed decreases, the movable back iron segments may be drawn back to the fixed back iron due to the magnetic force between the two. In other embodiments, the movable back iron segments are tethered to the fixed back iron by springs or by tethering linkages that are spring loaded to provide a biasing force toward the fixed back iron. In some embodiments, the movable back iron segments move at different speeds so that a smoother transition in field strength as a function of rotational speed can be provided. The back iron segments react at different speeds due to differing weights by using differing density materials, a range of thicknesses or footprint sizes. In embodiments in which movable back iron segments are biased via a spring, the spring tension can be adjusted to provide the desired response. Mechanical, electrical, pneumatic or hydraulic actuators can also be used to move the rotor back iron segments.

In FIG. 2, a motor in which there are three ranges of field strength is shown. The CSPR is two times, just like that shown in FIG. 1. Thus, for the first range of field strength, there is a Nmin1 and a Nmax1 that are in the ratio of 1:2. There is also a second range of field strength that yields a $N_{min2}$ and a $N_{max2}$ also in the ratio of 1:2. If $N_{min2}$ were equal to $N_{max1}$ and $N_{min3}$ equal to $N_{max2}$, the resulting CSPR is eight. As it might be desirable to have $N_{min2}$ be a little less than $N_{max1}$, the resulting CSPR would be somewhat less than eight.

In other embodiments, the movable back iron segments are applied to the rotor using an actuator to move them. In passive control made possible by centrifugal force acting on the movable back iron segments on the rotor, rotor speed is the only factor by which the movable back iron segments are adjusted. By actively controlling the actuator, the demand for torque by the operator, temperatures in the motor or a battery pack coupled to the motor, state of charge of the battery, or other factors could be inputs to the electronic control unit that commands control of the actuator. A plurality of back iron segments as well as a plurality of actuators can be employed to provide a series of steps in field strength.

In yet another embodiment, the field strength of the motor can be weakened by affecting the reluctance of the stator ring. This can be accomplished by having a fixed stator ring and one or more movable stator ring segments. Because the stator is not rotating, an actuator is used to cause the movable stator ring segments to separate from the fixed stator ring.

Also disclosed is a method to operate an electric motor in which the stator has a fixed back iron and movable back iron segments. The movable back iron segments are moved by an actuator between a first position in which the movable back iron segments are in contact with the fixed back iron and a second position in which the movable back iron segments are displaced from the fixed back iron. An electronic control unit commands the actuator to move the movable back iron segments based on one or more of motor speed, demand for motor torque, motor temperatures, and state of charge of a battery supplying electricity to the motor. In one embodiment, a desired field strength is determined based at least on the speed of the motor. An electronic control unit (ECU) commands an actuator coupled to the movable back iron segments to provide the desired field strength in a system with a continuously variable field strength and to approximately provide the desired field strength in a system in which the field strength is stepwise variable.

In some embodiments, the desired field strength is further based on the operating mode. For example, the state of charge of the battery affects the optimum field strength, i.e., that which provides good efficiency. Also, battery regeneration or charging requires a field strength (higher voltage condition) than battery discharging. Thus, such information provided to the ECU is used to select the desired field strength suitable for the operating mode.

BRIEF DESCRIPTION OF THE DRAWINGS

FIGS. 6 and 7 are end views of the rotor and stator of the axial flux motor with movable back iron segments in contacting and non-contacting positions, respectively;

FIG. 10 shows a cross section of a rotor having movable back iron segments of varying thicknesses;

DETAILED DESCRIPTION

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications. As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
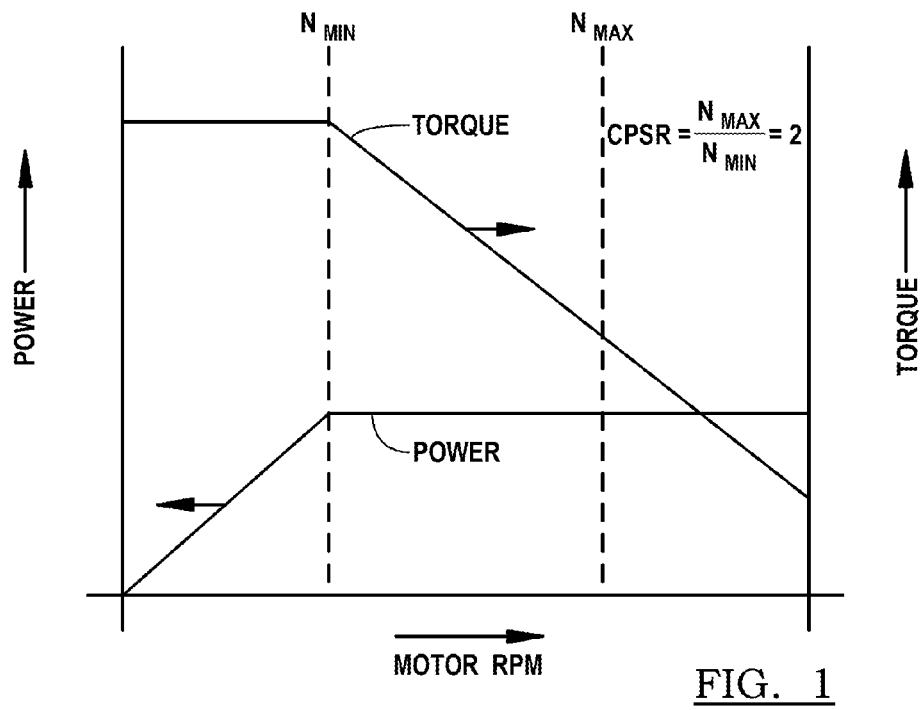
FIGS. 1 and 2 are graphs of torque and power provided by a motor as a function of motor speed.
Figure 2:
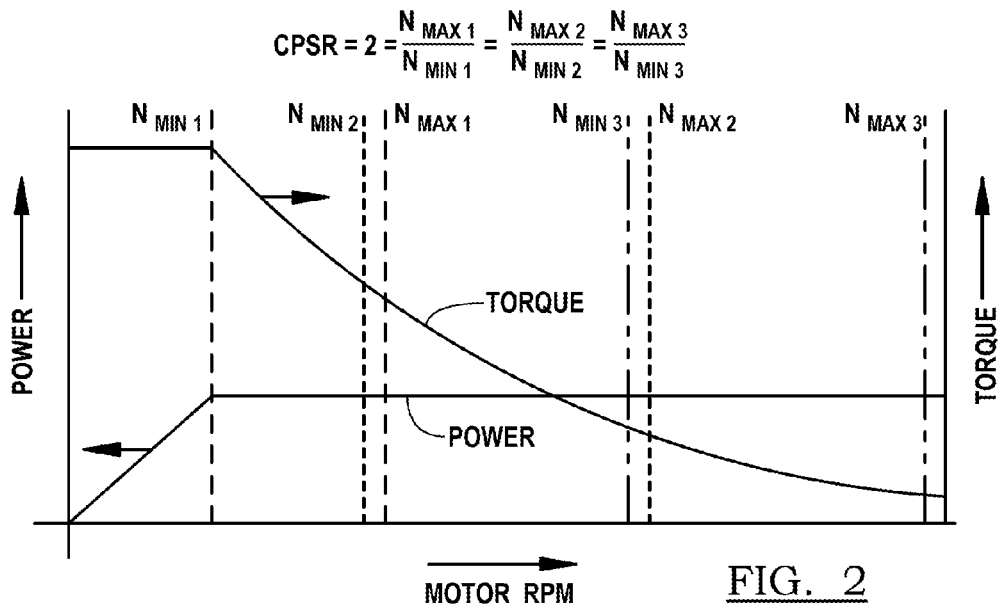
Figure 3:
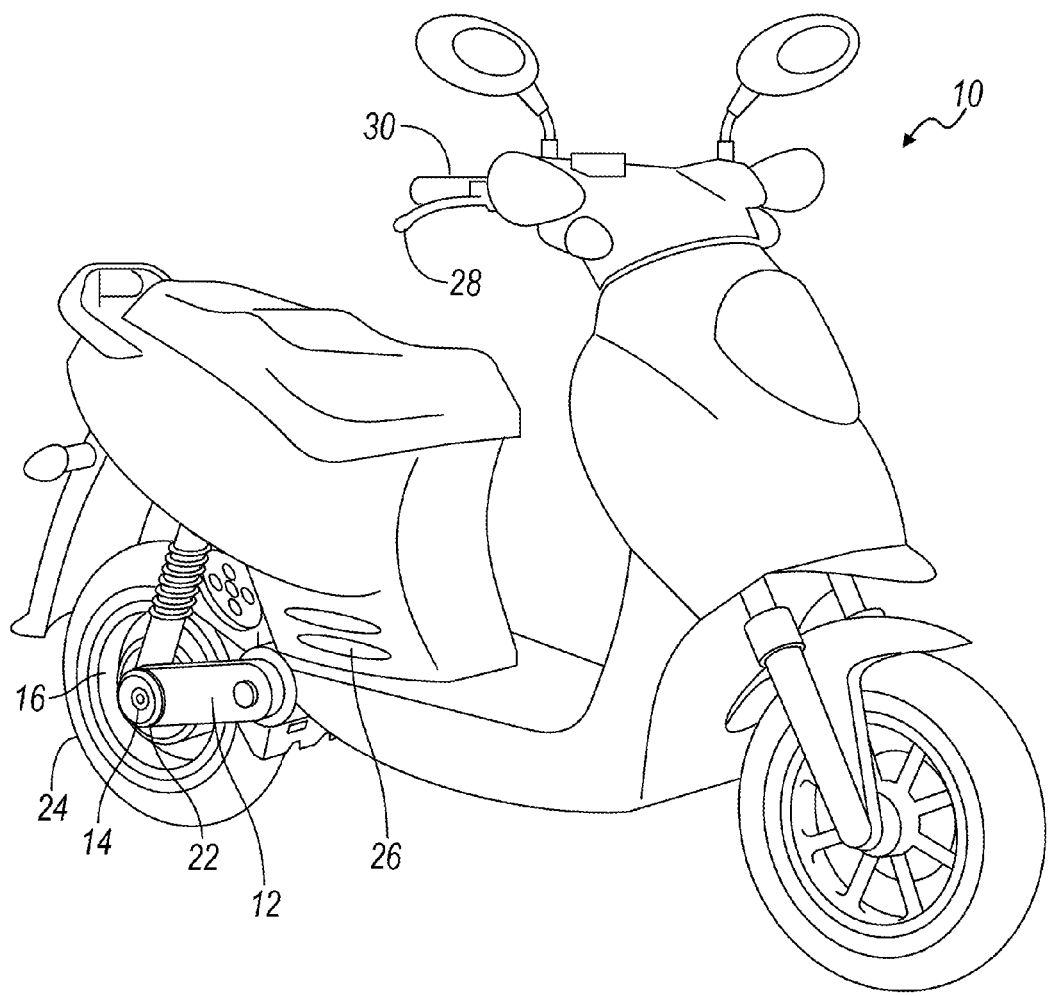
FIG. 3 is an illustration of an electric motor powered scooter.

A motor scooter 10 is illustrated in FIG. 3. The motor scooter 10 has a frame 12 to which an axle 14 is coupled. The axle 14 is coupled through the center of a wheel 16, the wheel 16 being rotatable with the axle 14. The wheel has a rim 22 onto which a tire 24 is mounted. As described in more detail in FIG. 5, a stator may be coupled to the axle 14 and a rotor may be coupled to the rim 22. The stator and rotor are elements of an electric motor powered by an onboard battery (not separately visible) behind a cover 26. The motor scooter 10 has operator controls 28 and 30 through which the operator can indicate a demand for power and/or braking Operator controls 28 and 30 may be coupled electronically to an electronic control unit (not shown in FIG. 3).

A form of electric motor has a cylindrical rotor surrounded by a cylindrical shell stator, commonly called an internal-rotor motor. The rotor and stator are separated by a small air gap. An internal rotor motor may also be a radial-flux motor because the magnetic flux passes in the radial direction across the air gap between the rotor and stator. Another form of electric motor is an external-rotor radial-flux motor, which has a fixed internal stator surrounded by a cylindrical shell rotor. Another type of motor may have a disc-shaped rotor and stator, and is called an axial-flux motor because the flux passes in the axial direction between the rotor and stator.

While the axial-flux motors and radial-flux motors discussed, the present disclosure relates to electrical machines including: dedicated motors, dedicated generators, and those that switch between operating as a motor and a generator. The present disclosure applies to all such electrical machines. In FIG. 3, an electric motor scooter is shown. However, the present disclosure relates to all motor vehicles: automobiles, electric bikes, etc. and even more broadly to all permanent magnet electrical machines.

Figure 4:
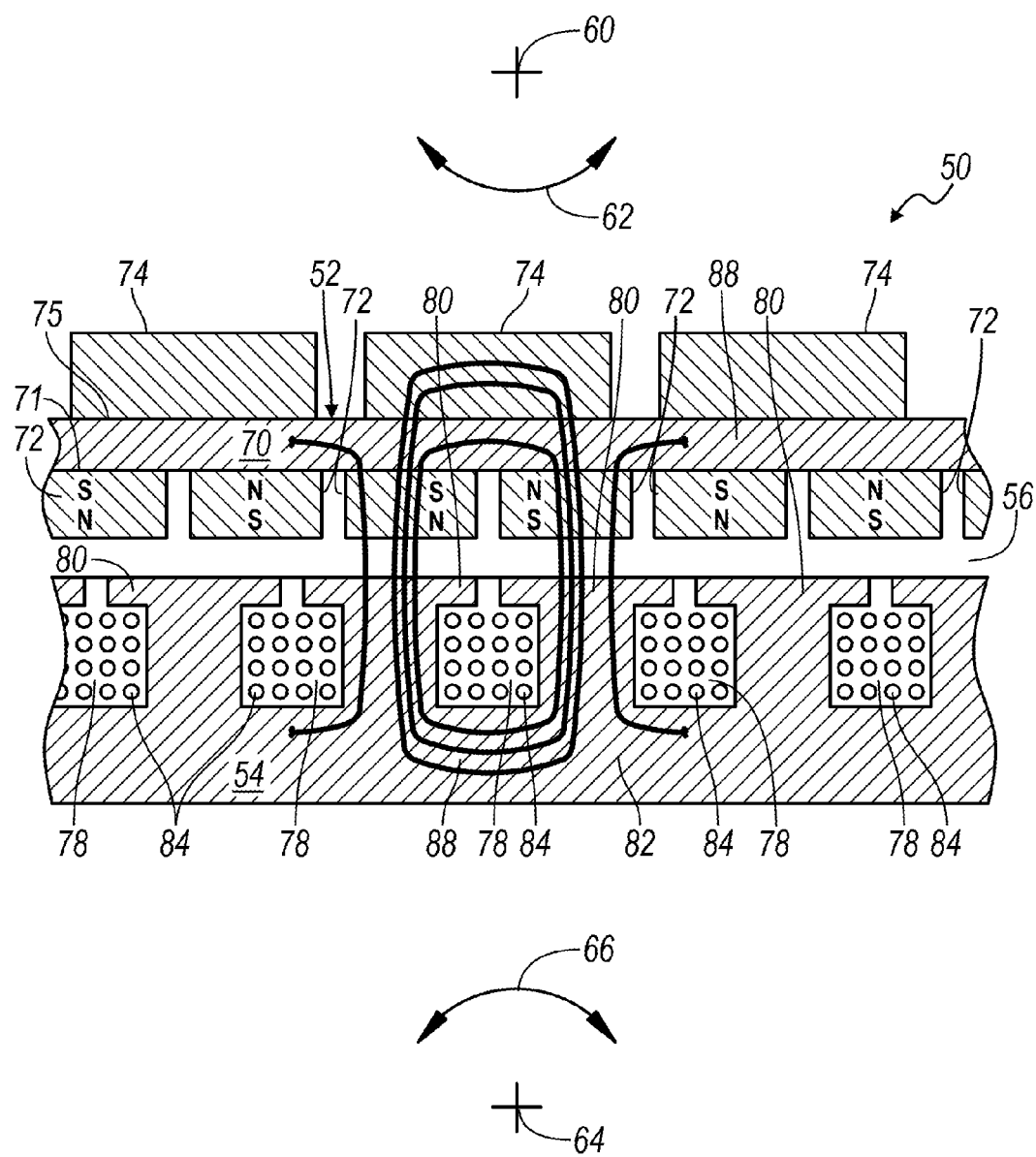
FIG. 4 is a cross section of a portion of an electric motor.

A cross-sectional detail of an electric motor 50 according to an embodiment of this disclosure is shown in FIG. 4. The motor 50 has a rotor 52 and a stator 54 separated by an air gap 56. For convenience of illustration, the rotor 52 and the stator 54 are shown as linear elements. However, it is more common for the rotor 52 to rotate with respect to the stator 54. In one configuration, the axis about which the rotor spins is 60 and the rotor 52 and stator 54 are curved in the direction of arrows 62. In alternative configuration known as external-rotor, or sometimes referred to an inside-out motor, the axis about which the rotor spins is 64 and the rotor 52 and stator 54 are curved in the direction of arrows 66.

Continuing to refer to FIG. 4, rotor 52 has a fixed back iron 70 and a plurality of permanent magnets 72 affixed to a surface 71 of fixed back iron 70 that is proximate stator 54. Adjacent permanent magnets 72 have the opposite polarity, i.e., the north pole of the magnet is proximate the south pole of the adjacent magnets. The rotor 52 also has a plurality of movable back iron segments 74 positioned adjacent to a rear surface 75 of the fixed back iron 70 distal from the stator 54. As will be described in more detail below, the moveable back iron segments 74 may be movably attached to the fixed back iron 70. In another embodiment, the electric motor 50 have a relatively thin fixed back iron 72 or no fix back iron at all, in which case, the moveable back iron segments 74 are positioned adjacent the permanent magnets 72 or a non-magnetic support structure.

As further illustrated in FIG. 4, the stator 54 has a plurality of slots or channels 78. The slots or channels 78 are wider at a distal end 79 as the slots 78 extend away from air gap 56 and the slots 78 are narrower proximate the air gap 56. T-shaped posts 80 are formed between the slots 78. Many wraps of a wire 84 are wound around the T-shaped posts 80 such that the wire 84 extends outwardly from a stator back iron 82 through the slots 78. Multiple wraps of wire windings 84 are shown in cross section within slots 78. Also shown in FIG. 4 are magnetic flux lines 88.

Figure 5:
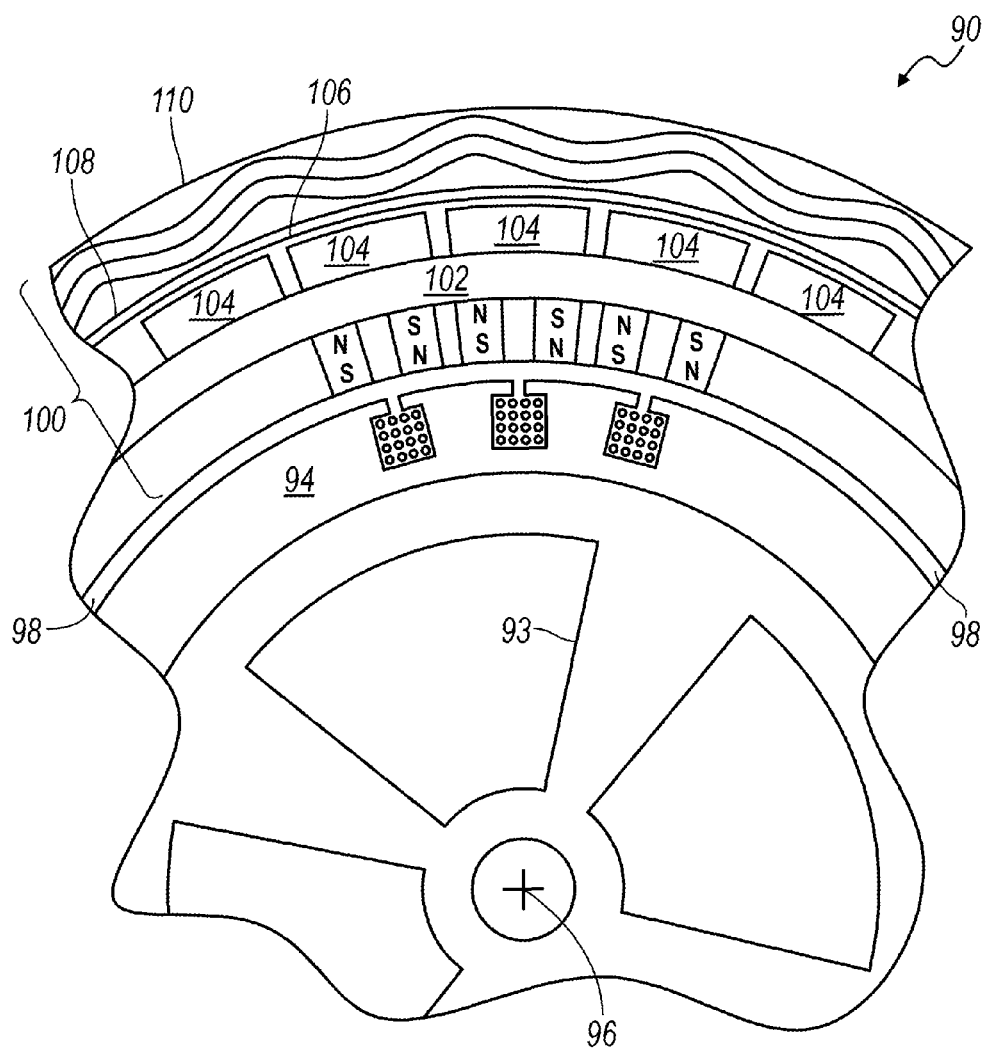
FIG. 5 is a portion of a cross section of a portion of a radial flux electric motor incorporated into a wheel.

In FIG. 5, an electric motor is illustrated according to FIG. 4 is integrated into a wheel 90. A hub 92 has spokes 93 supporting the stator 94 and rotates about an axis or an axle 96. An air gap 98 separates stator 94 from rotor 100. The rotor 100 has a fixed back iron 102 as well as movable back iron segments 104. Movable back iron segments 104 are shown in a first position in which they are in contact with fixed back iron 102. Movable back iron segments 104 are held onto fixed back iron 102 by magnetic attraction, in one embodiment. Alternatively, movable back iron segments 104 are biased toward the fixed back iron 102 by a spring loaded tether or a spring. When the rotor 100 rotates, the movable back iron segments 104 separate or move a distance from the fixed back iron 102 when the centrifugal force overcomes the magnetic or spring force. A tray 106 is provided to contain movable back iron segments 104 when separated from fixed back iron 102. An outer surface 108 of the tray 106 forms the rim for mounting a tire 110.

In FIGS. 6 and 7, a rotor 120 of an axial-flux motor configuration is shown. As illustrated in FIGS. 6 and 7, the rotor has a fixed back iron 122 and movable back iron segments 124 coupled to the fixed back iron 122 with a locating device to contain the movable back iron segments 124 from moving from the fixed back iron 122 more than a predetermined maximum distance. The locating device may include at least one tether 126. In one embodiment, the tether 126 may be biased or spring-loaded. In other alternatives, movable back iron segments 124 may be tethered by tethers 126 without being biased so that the movable back iron segments 124 are allowed to float radially outward with respect to back iron segments 142 with centrifugal force. The tethers 126 prevent the moveable back iron segments 124 from moving outward more than a small distance.

Figure 8:
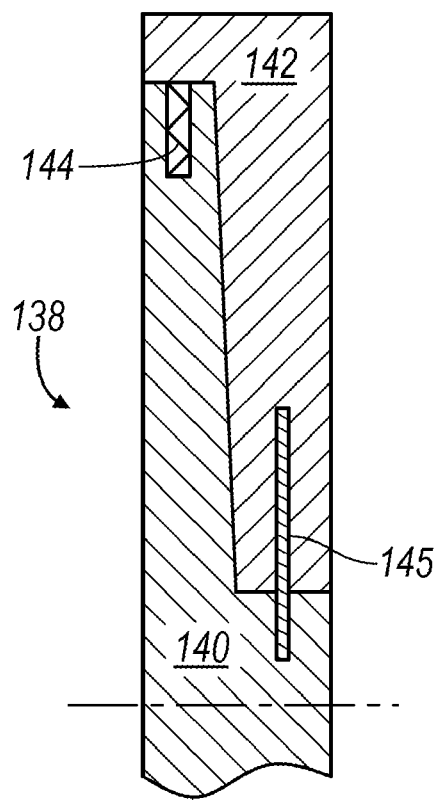
FIGS. 8 and 9 show a cross section of a rotor for an axial flux motor with a movable back iron segment tethered to the periphery of the rotor.

As illustrated in FIGS. 6 and 7, the tethers 126 are coupled to movable back iron segment 124 at joint 126a and coupled to fixed back iron 122 at joint 126b. A side view of rotor 120 separated by an air gap 128 from stator 130 are shown in FIG. 7. The movable back iron segments 124 are in contact with the fixed back iron 122 in FIG. 7. In FIG. 8, however, rotor 120 is spinning such that the movable back iron segments 124 separate a distance from back iron 122 due to centrifugal force thereby forming an air gap therebetween. Stator 130 includes coils of wire which are not shown FIGS. 6 and 7.

FIG. 8 illustrates a cross-section view of a rotor 138 for an axial-flux electric motor having a fixed back iron 140 and movable back iron segments 142 coupled to together by a locating device including a spring 144 and guide pin 145. The spring 144 may bias the moveable back iron segments 142 away from the fixed back iron 140, or may also provide a biasing force to a return the movable back iron segments 142 back towards the fixed back iron 140. Illustrated in FIG. 8 is the situation when rotor 138 is stationary or rotating at a speed at which centrifugal force acting on movable back iron segment 142 is less than the spring tension acting on back iron segment 142.

Figure 9:
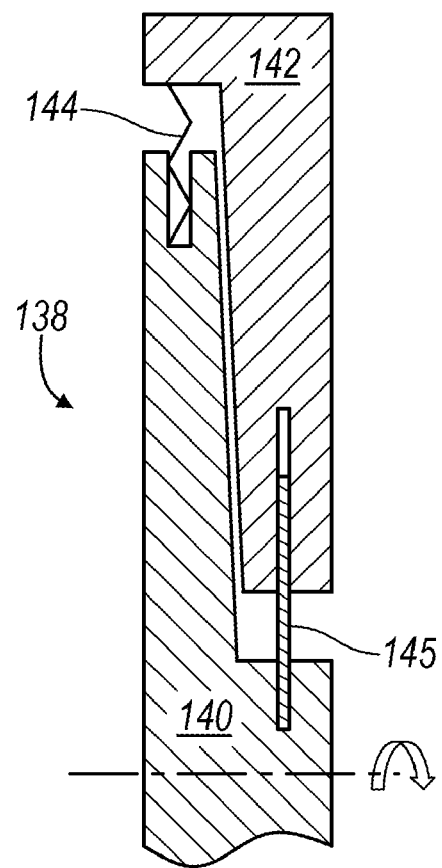

FIG. 9 is an illustration of rotor 138 rotating above the threshold speed so that back iron segment 142 moves radially away from fixed back iron 140 due to centrifugal force. Fixed back iron 140 and movable back iron segment 142 are slightly angled so that as movable back iron segment 142 moves outward radially, a small axial gap between the fixed back iron 140 and movable back iron segment 142 develops. So that the gap forms, the guide pin 145 coupled to fixed back iron 140 slides in a sleeve within movable back iron segment 142.

In FIG. 10, a portion of a rotor 148 in a radial-flux external-rotor machine is shown with a fixed back iron 150 and groups of movable back iron segments 152, 154 and 156. The three groups of movable back iron segments 152, 154 and 156 may have different thicknesses or weights such that one group of moveable back iron segments separate from fixed back iron 150 at a lower speed than the other movable back iron segments. By changing the reluctance of the back iron in steps, the magnetic field changes more gradually as the speed moves through the ranges of transition. In other alternatives, the various movable back iron segment groups are made of materials of differing density so that the movable back iron segments have different weight. In another alternative, the back iron segments are tethered either by spring-loaded tethers or springs. The spring tension of the different groups is different to provide the desired response, i.e., separation of the groups in different speed ranges.

Alternatives for altering the reluctance of the back iron of the rotor are described above in which the movable back iron segments are acted upon by centrifugal force, thus moving based on rotor rotational speed. Alternatively, reluctance of the stator ring can be adjusted to affect the field strength. However, because the stator does not rotate, no centrifugal force acts upon the movable stator segments and thus an actuator is used to provide the movement of the stator segments.

Figure 11:
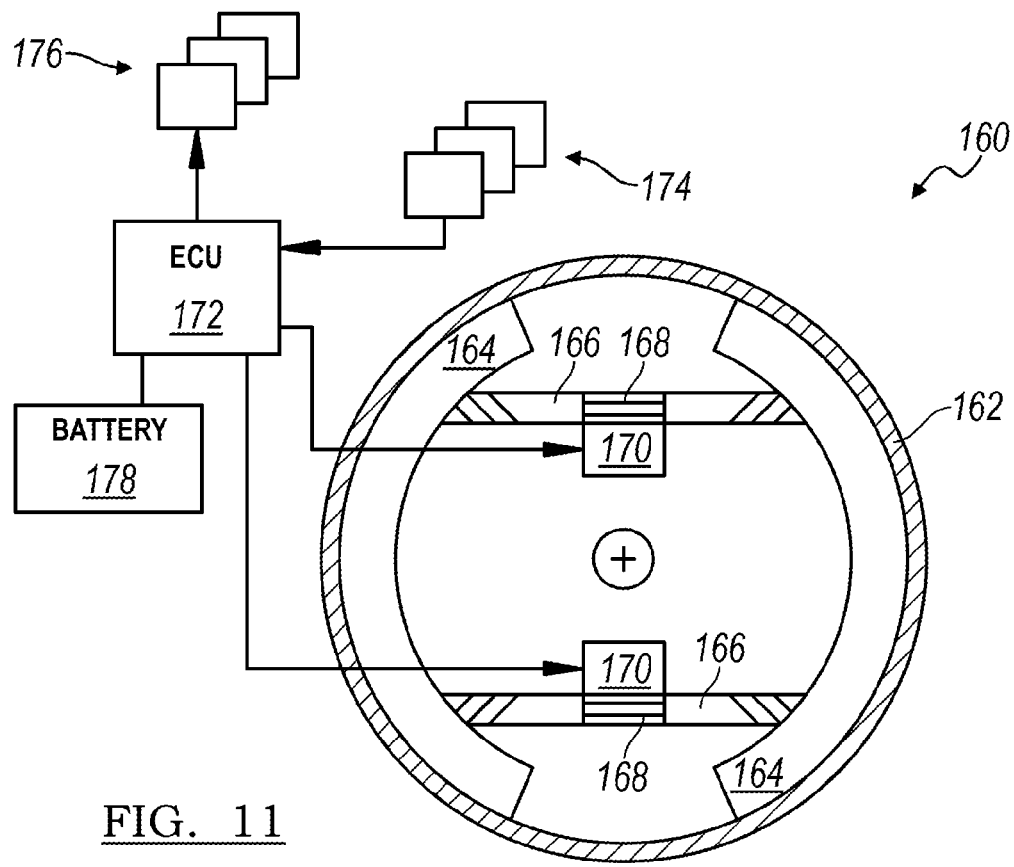
FIGS. 11-13 illustrate stators with back iron segments movable by actuating systems.

In FIG. 11, a stator 160 in an external-rotor radial-flux machine is shown with a fixed stator ring 162. Movable stator segments 164 are shown in contact with fixed stator ring 162. Posts 166 are provided with threads 165. Left hand threads 165 are provided on one end, right hand threads 165 are provided on the opposite end, and gear teeth 168 that can be engaged by small electric motors 170, such as stepper motors. By rotating posts 166 in one direction, movable back iron segments 164 are separated from fixed stator ring 162. By rotating posts 166 in another direction, movable stator segments 164 are returned to the position shown in FIG. 11 in which they are in contact with fixed stator ring 162. Coils of wire in the stator 160 and the permanent magnet rotor surrounding the stator 160 are not shown in FIG. 11.

An electronic control unit (ECU) 172 commands operation to motors 170. ECU 172 receives inputs 174 from various sensors which provide signal from which one or more of motor speed, current flowing in the motor windings, voltage across the motor, speed demanded by an operator of a motor vehicle, torque demanded by the operator, braking force demanded by the operator, system temperatures, state of charge of battery 178, geographical position, etc. may be determined. ECU 172 may also command various functions, i.e., provide control outputs 176, based on the inputs 174.

Figure 12:
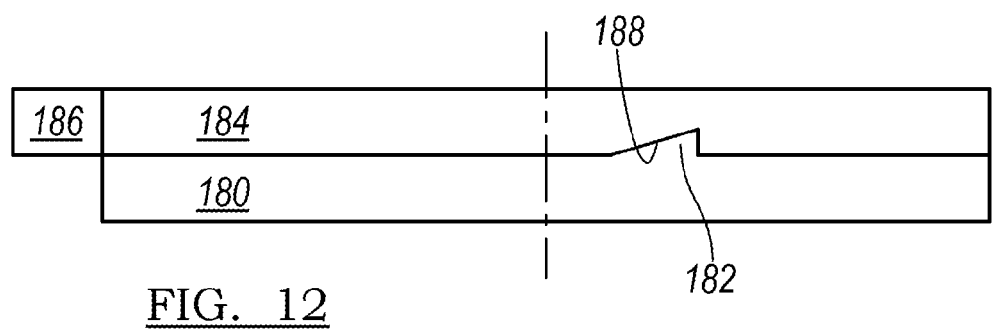
Figure 13:
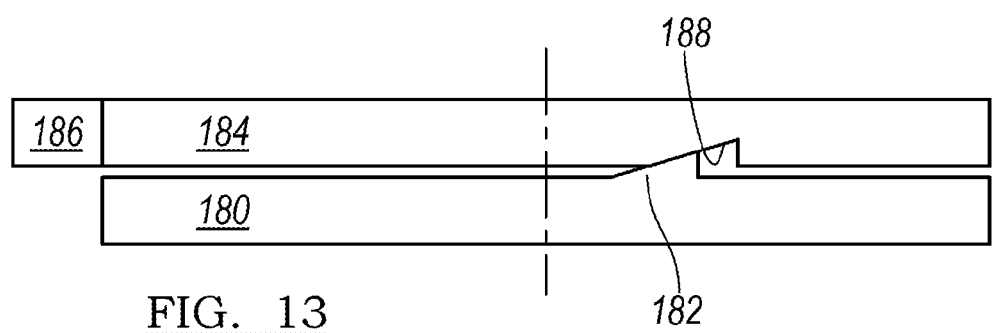

In FIG. 12, a stator of an axial-flux machine has a fixed stator ring 180 having a shallow ramp 182 is shown in an edge view. Fixed stator ring 180 is disk shaped. In contact with fixed stator ring 180 is a movable stator ring 184 that couples to a stepper motor 186 or other actuator. Movable stator ring 184 has an inward ramp 188 that couples with ramp 182. When movable stator ring 184 is rotated in the direction indicated by the arrow by action of motor 186, movable stator ring 184 is caused to separate from fixed stator ring 180 by ramp 188 riding up ramp 182. A series of such ramps are provided on the periphery to properly support the movable stator ring.

Figure 14:
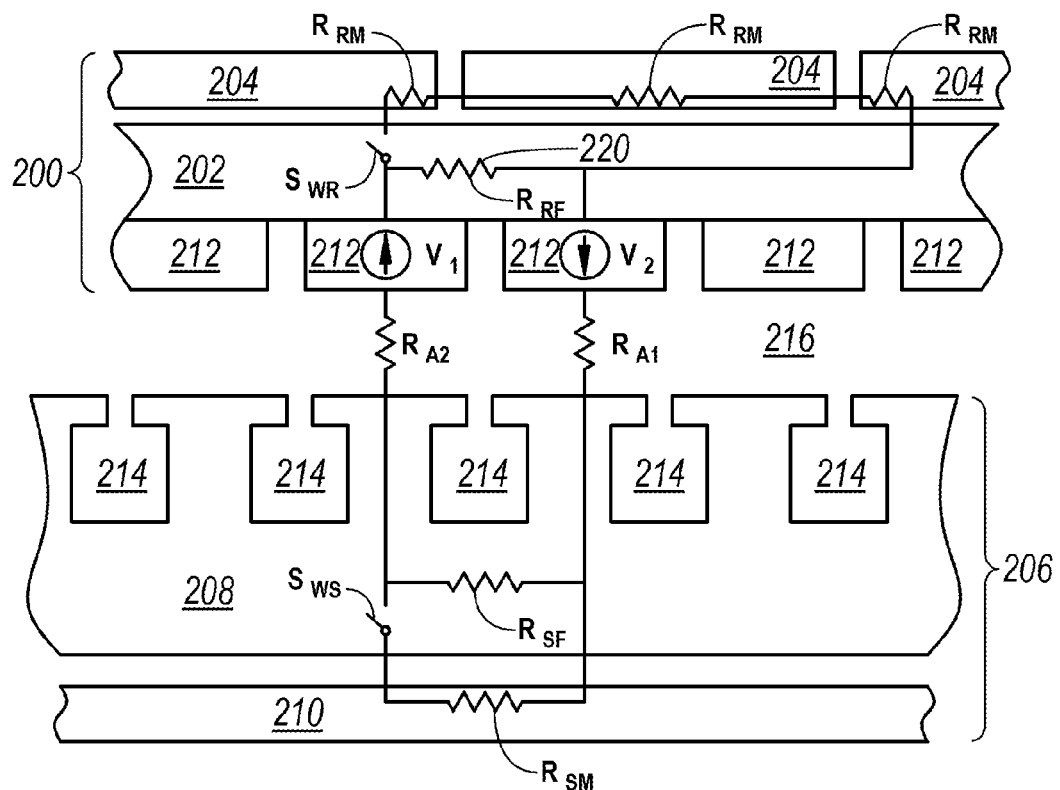
FIG. 14 illustrates an equivalent electrical circuit that can be used to analyze the magnetic circuit of the motor, with back iron represented by resistors, movable back iron is shown in parallel with the stator and rotor resistors, with switches to represent them being disconnected when moved away. When the back iron is in contact, the switch is closed and the two resistors are in parallel, so their total resistance is lower.

The magnetic system can be illustrated and analyzed through a simplified equivalent electrical circuit model as shown in FIG. 14 in which rotor 200 has fixed back iron 202 and movable back iron segments 204 and magnetic reluctance is modeled as resistance. Stator 206 has fixed back iron or ring 208 and movable back iron segment or ring 210. The motor may not have both movable back iron segments 204 and 210, however, both are included in FIG. 14 for illustration of the model. Permanent magnets 212 are provided on the surface of fixed back iron 202. Stator 206 has a series of slots or channels 214 into which windings are wrapped. An air gap 216 is maintained between rotor 200 and stator 206. Fixed back iron 202 is modeled as a resistor 220 of resistance $R_{Rf}$. As movable back iron segments 204 are not in contact with fixed back iron 202, they contribute negligibly to the flow of current. However, when elements 202 and 204 are in contact, resistor 220 has the resistance of the fixed back iron in parallel with the resistance of the movable back iron to make a lower total resistance. Similarly, stator 206 is modeled as a resistor of resistance $R_{Sf}$ when the fixed stator ring 208 and movable stator ring 210 are separated. Adjacent magnet 212 is voltage sources, $V_1$ and $V_2$. Air gap 216 is modeled as resistances $R_{A1}$ and $R_{A2}$. Movable back iron segments 204 can be modeled as resistances $R_{Rm}$ which are in parallel with the resistance of the fixed back iron, $R_{Rf}$. However, as shown in FIG. 14, movable back iron segments 204 are not in contact with fixed back iron 202. To model such a configuration, an open switch, $Sw_R$, is shown in FIG. 14. When the movable back iron segments 204 are in contact with fixed back iron 202, switch $Sw_R$ is closed. Analogously, movable stator back 210 is modeled as a resistor, $R_{Sm}$, in parallel with resistor $R_{Sf}$ modeling fixed stator ring 208. However, as shown, movable stator ring 210 is not in contact with the fixed stator ring 208 and thus switch $S_{wS}$ is shown in FIG. 14 as being open.

In the examples illustrated in the Figures, permanent magnets are shown affixed to the rotor. In some applications, however, the permanent magnets are cast into openings in the rotor, such as by sintered materials, to thereby capture the magnets to prevent them from becoming detached from the rotor and to change the magnetic properties of the magnet and rotor assembly. The present disclosure is applicable to these internal permanent magnet rotor configurations as well.

Figure 15:
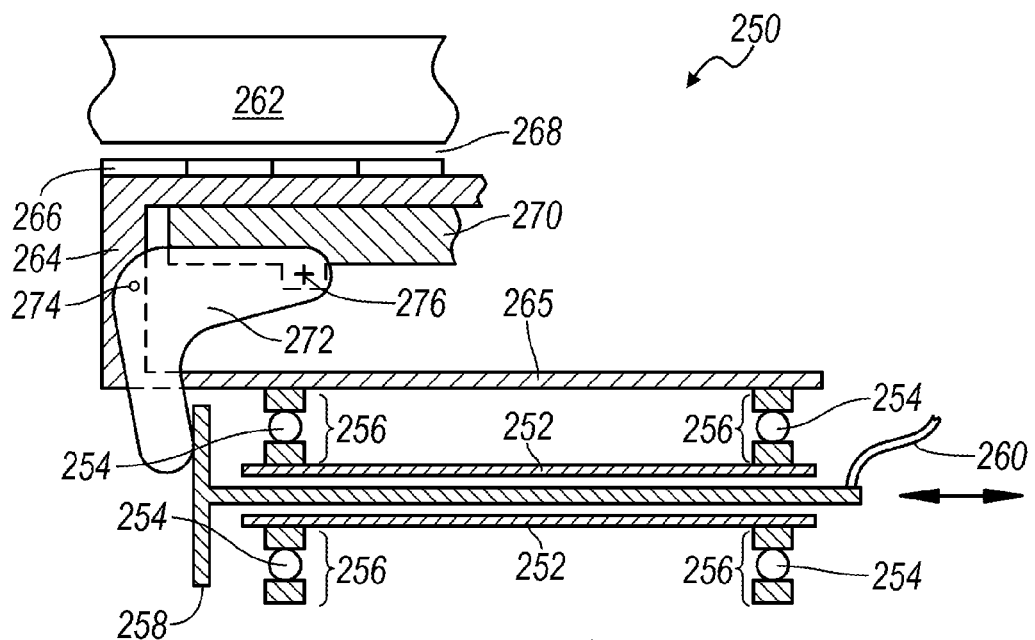
FIG. 15 shows a cross section of an internal rotor motor with a movable back iron segment illustrating a state in which the movable back iron segment is contact with the fixed back iron segment.

In FIG. 15, a cross section of a portion of an internal rotor radial-flux electric motor 250 illustrates an embodiment in which a movable back iron segment is actuatable. An axle 252 is supported on ball bearing 254 in a bearing assembly 256. An actuator rod 258 having a flange portion at one end is mounted within axle 252. In FIG. 15, a cable 260 is coupled to actuator rod 258. By applying or releasing tension on cable 260, rod 258 is caused to move with respect to axle 252. Motor 250 has a stator with windings 262. The rotor includes a fixed back iron 264 onto which magnets 266 are affixed. Fixed back iron 264 is coupled to a support 265 of the rotor that rotates on bearing assemblies 256. Movable back iron segments 270 are provided, with only one such movable back iron segment 270 shown in FIG. 15. A bell crank 272 is coupled to fixed back iron 264 via a pivot joint 274 and is fixed to movable back iron segment 270 via a pivot joint 276. Bell crank 272 contacts the flange end of actuator rod 258. In FIG. 15, movable back iron segment 270 abuts fixed back iron 264.

Figure 16:
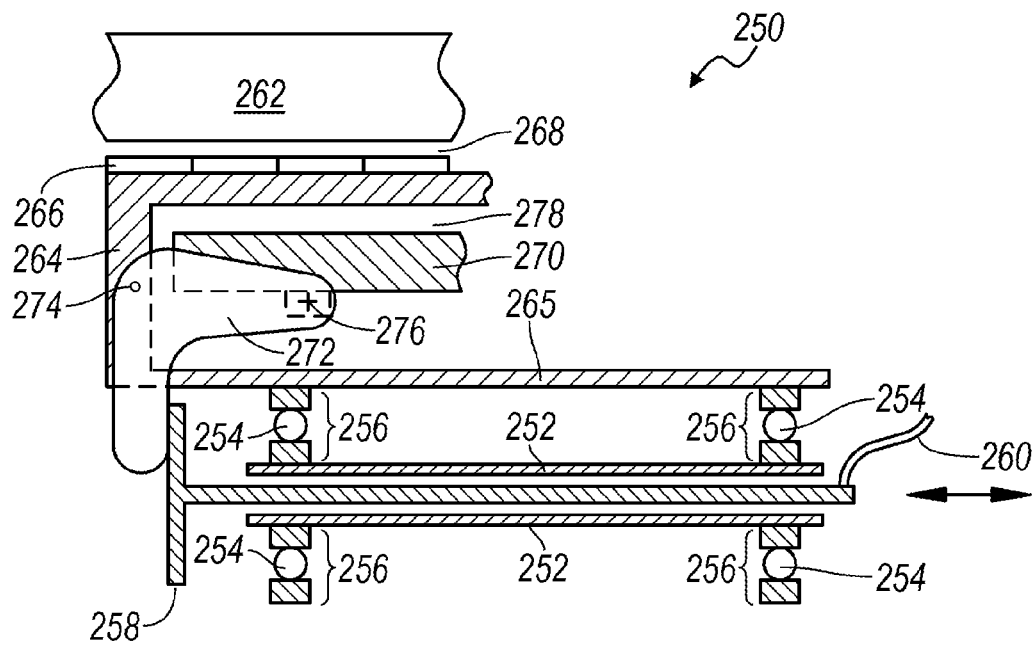
FIG. 16 shows a cross section of the internal rotor motor of FIG. 15 illustrating a state in which the movable back iron segment is separate from the fixed back iron segment.

Referring now to FIG. 16, actuator rod has been displaced to the left with respect to axle 252. Due to the flange end of actuator rod 258 moving to the left, bell crank 272 rotates clockwise around pivot joint 274 thereby pulling movable back iron segment 270 downward. An air gap 278 now exists between fixed back iron 264 and movable back iron segment 270. Air gap 278 weakens the field strength. In the movable back iron segments 306 being in position with an air gap 308. One bell crank 272 may be provided to actuate each movable back iron segment 270. Bell cranks 272 may be coupled to an axle.

The discussion of an internal rotor motor in relation to FIGS. 15-16 is directed to one example of a motor in which the movable back iron segments can be actuated under external control. In the example shown, a cable is shown. However, an electrical actuation via a linear actuator, hydraulic actuation, or a host of other actuation schemes may be alternatively used. The actuator may be under operator control or be controlled by an electronic control unit. For example, the electronic control unit may be provided signals concerning vehicle and motor parameters and command the movable back iron segments to move accordingly. Also, the particular mechanical configuration having a bell crank that is moved via an actuator rod is not intended to be limiting. Many other suitable configurations could be used instead.

Figure 17:
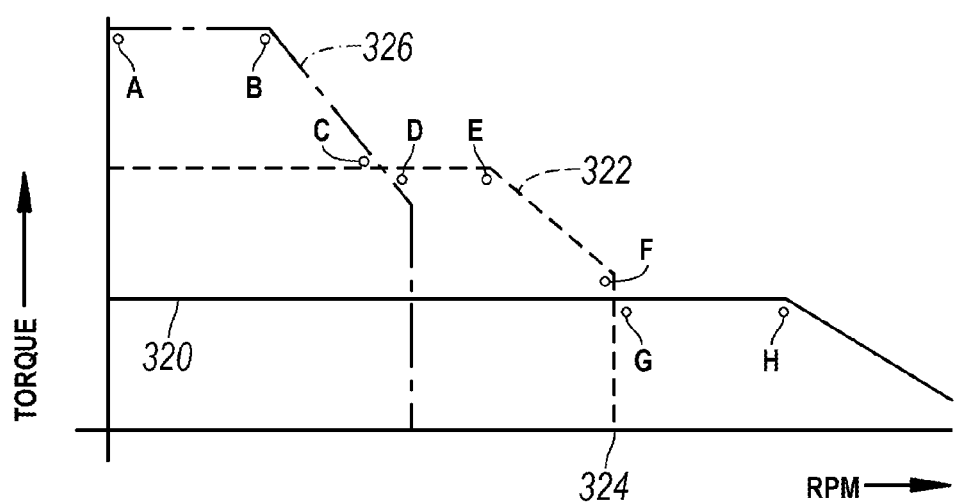
FIG. 17 is a graph of torque vs. rpm for three levels of field strength.

In FIG. 17, a graph of torque as a function of motor RPM is shown according to an embodiment of the disclosure. The solid curve 320 shows a situation for a motor with a fixed field strength in which a large speed range is desired. The constant torque region occurs over a wide range of speed. However, there are two problems with such operation. The maximum torque is limited. Furthermore, the operation is not nearly as efficient as desirable across the speed range. Curve 322 shows a situation in which the field strength is greater. The maximum torque is greater, but the speed is limited to that shown as 324. A motor with even a greater field strength has characteristics of curve 326, with a greater torque at the lower motor speeds, but a very limited range in speed. The limits in speed are due to the back EMF in the motor becoming excessive. By providing three ranges of field strength, the motor's dynamic range improves tremendously and with good efficiency. Thus, if an increase in motor speed is requested from a starting at point A in which the motor speed is low and the desired torque is high, the high field strength can accommodate accessing point B, which also provides a high torque. Beyond point B, the torque must drop, but the power is constant, i.e., along B to C. However, very little further increase in motor speed is possible unless the field strength is weakened, such as illustrated by curve 322. By doing so, points D, E, and F are accessible, with D to E being a constant torque/increasing power, and points E to F being at a constant power/decreasing torque. Likewise, a further decrease in field strength allows accessing points G and H. By providing three levels of field strength, a high torque can be provided at low speed along with a wide speed range and near a peak efficiency condition across the range of speed.

Figure 18:
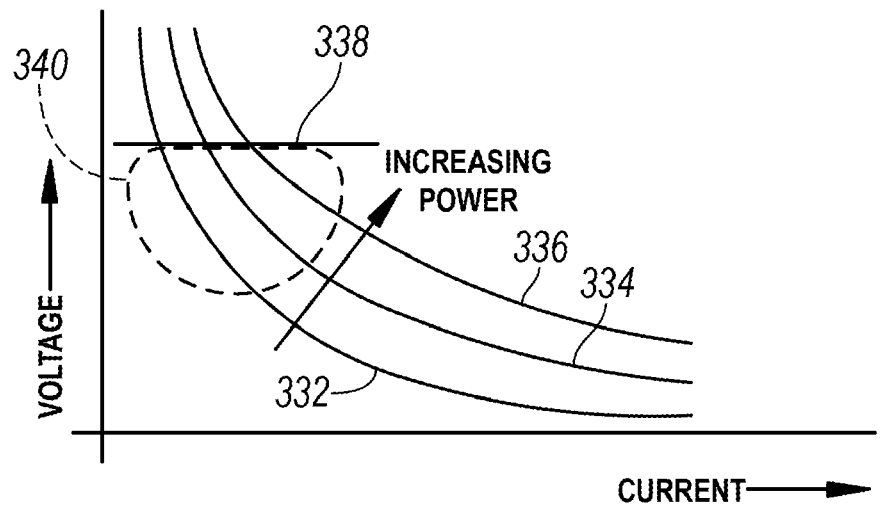
FIG. 18 shows a family of curves at constant power on a voltage-current graph.

It is desirable to operate the motor at the minimum-current/high-voltage point to generate the demanded power because the resistive losses are related to current squared and thus losses are minimized at low current. Consequently, the motor's efficiency is improved and undesirable heating of the motor is reduced. An additional benefit is that the power electronics associated with the motor does not step down the battery voltage as much, so the electronics can be simpler and more efficient. By selecting field strength data in the desired range, a family of curves for a range of powers and speeds can be generated, as shown in FIG. 18. Thus, to operate the motor at an efficient condition at a particular speed and power, the field strength is varied per the relationship shown in FIG. 18, i.e., dependent on motor rotational speed.

Referring now to FIG. 18, a control strategy is illustrated graphically. FIG. 18 graph of voltage as a function of current is shown for a range of power levels. Curve 332 may represent, for example, 25 W; curve 334 represents 50 W; and curve 336 may represent 100 W. The voltage is limited such that operation above line 338 is not possible. For example, if a battery coupled to the motor is a 12 V battery, the limit of line 338 is 12 V. It is more efficient to operate at the lowest possible currents. Thus, the desired operating range is shown as a high efficiency area 340 in FIG. 18. As the motor speed changes, the control system acts to change the field strength to maintain operation in this high efficiency area 340.

Figure 19:
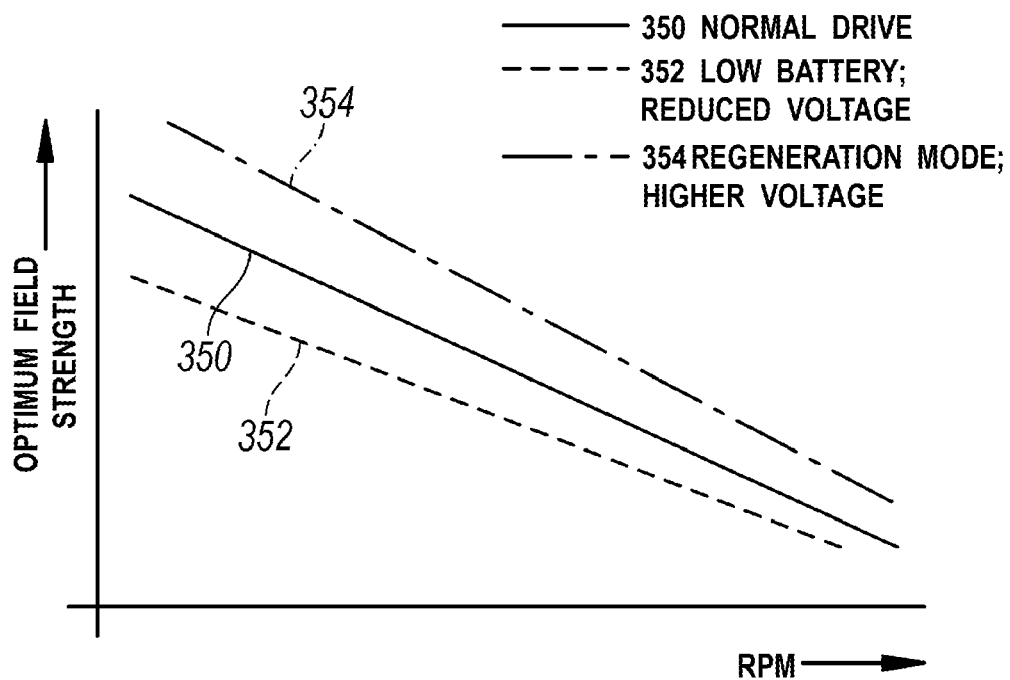
FIG. 19 shows optimum field strength as a function of rpm for three operating modes: normal drive, low battery, and battery regeneration.

In FIG. 19, the optimum field strength as a function of motor speed is shown for normal operating mode, e.g., at 72 V, curve 350. When the battery is getting low, the battery voltage drops and the optimum field strength drops, as shown in curve 352. In a battery regeneration mode, e.g., during regenerative braking in an electric vehicle, the voltage is higher than the battery voltage and the optimum field strength is higher, shown as curve 354. In embodiments in which the field strength is continuously variable, the field strength is selected based on both motor RPM and the operating mode, normal, low battery, regeneration, etc. In embodiments in which the field strength is stepwise variable, the field strength step is selected to be as close as possible to the optimum field strength as a function of motor RPM and operating mode.

By maintaining the field strength within the band labeled as desired, the losses are minimized. This can be accomplished by continuously varying the field strength, such as by a continuous actuator moving one or more movable back iron segments away from the fixed back iron or in steps by actuating as many of the segments as indicated to provide the desired field strength, i.e., that which allows current to be at or near the minimum. The description above also applies to an electric machine operated as a generator.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine, comprising:
    a stator; and
    a permanent magnet rotor having at least one movable back iron wherein a magnetic field of the electric machine is weakened when at least one of the at least one back iron is moved away from the rotor.

2. The electric machine of claim 1, further comprising:
    a controller configured to command at least one of the at least one movable back iron to move based on an operating condition of the electric machine.

3. The electric machine of claim 2 wherein the operating condition comprises a rotational speed of the electric machine.

4. The electric machine of claim 2 wherein the operating condition comprises a requested power level output of the electric machine.

5. The electric machine of claim 2, further comprising:
    an actuator in communication with the controller and coupled to the at least one movable back iron, wherein the controller commands the actuator to move at least one of the at least one movable back iron based on the operating condition.

6. The electric machine of claim 3 wherein the at least one movable back iron comprises a plurality of movable back irons, wherein one of the plurality of movable back irons is moved away from the rotor at a different rotational speed than at least one other of the plurality of movable back irons.

7. An electric machine, comprising:
a permanent magnet rotor; and
a stator having at least one movable ring segment, wherein a magnetic field of the electric machine is weakened when at least one of the at least one ring segment is moved away from the stator.

8. The electric machine of claim 7, further comprising:
a controller configured to command at least one of the at least one movable ring segment to move based on an input received by the controller.

9. The electric machine of claim 8 wherein the input comprises a rotational speed of the electric machine.

10. The electric machine of claim 8 wherein the input comprises a requested power level output of the electric machine.

11. The electric machine of claim 8, further comprising:
an actuator in communication with the controller and coupled to the at least one movable ring segment, wherein the controller commands the actuator to move at least one of the at least one movable ring segment based on the input.

12. The electric machine of claim 7 wherein the movable ring segment is adapted to move in a radial direction.

13. The electric machine of claim 7 wherein the electric machine is coupled to a vehicle, the vehicle comprising:
a vehicle frame;
an axle coupled to the frame, wherein the stator is coupled to the axle and the rotor is arranged circumferentially outside the stator; and
a wheel rotatable on the axle,
wherein at least one of the at least one movable ring segment is moved away from the stator by centrifugal force when the wheel is rotating at a speed greater than a threshold speed.

14. A method to control a permanent magnet electric machine having a rotor and a stator, the method comprising:
providing one of the rotor or the stator with at least one movable iron segment; and
moving at least one of the at least one iron segment away from the rotor or stator in order to weaken a magnetic field strength of the electric machine.

15. The method of claim 14 wherein at least one of the at least one iron segment is moved away from the rotor or stator based on an operating condition of the electric machine in order to achieve a desired magnetic field strength that allows operation of the electric machine at a high efficiency condition.

16. The method of claim 15 wherein the operating condition comprises a requested power level when the electric machine is operating as a motor and wherein the requested power level is based on an operator demand of the electric machine.

17. The method of claim 15 wherein the operating condition comprises a required voltage when the electric machine is operating as a generator wherein the required voltage is based on a load coupled to the generator.

18. The method of claim 17 wherein the load is a battery.

19. The method of claim 15 wherein the operating condition comprises a rotational speed of the electric machine.

20. The method of claim 15 wherein the operating condition comprises a request to change between a propulsive power mode, where the electric machine is operating as the motor, and a regenerative mode where the electric machine is operating as the generator.

* * * * *